United States Patent
Suzuki et al.

(10) Patent No.: US 10,638,536 B2
(45) Date of Patent: Apr. 28, 2020

(54) TERMINAL APPARATUS, COMMUNICATION METHOD, AND INTEGRATED CIRCUIT

(71) Applicant: SHARP KABUSHIKI KAISHA, Sakai, Osaka (JP)

(72) Inventors: Shoichi Suzuki, Sakai (JP); Tatsushi Aiba, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/072,749

(22) PCT Filed: Jan. 13, 2017

(86) PCT No.: PCT/JP2017/001008
§ 371 (c)(1),
(2) Date: Jul. 25, 2018

(87) PCT Pub. No.: WO2017/130737
PCT Pub. Date: Aug. 3, 2017

(65) Prior Publication Data
US 2019/0037637 A1    Jan. 31, 2019

(30) Foreign Application Priority Data
Jan. 29, 2016   (JP) .................................. 2016-015282

(51) Int. Cl.
*H04W 76/28* (2018.01)
*H04W 72/04* (2009.01)
(Continued)

(52) U.S. Cl.
CPC .......... *H04W 76/28* (2018.02); *H04L 1/1812* (2013.01); *H04W 52/0229* (2013.01);
(Continued)

(58) Field of Classification Search
CPC ..................................................... H04W 76/28
See application file for complete search history.

(56) References Cited

U.S. PATENT DOCUMENTS

2017/0201982 A1* 7/2017 Rico Alvarino .... H04W 72/042
2017/0202054 A1* 7/2017 Rathonyi .............. H04L 1/1812

OTHER PUBLICATIONS

3rd Generation Partnership Project; Technical Specification Group Radio Access Network; Evolved Universal Terrestrial Radio Access (E-UTRA); Physical channels and modulation (Release 13); 3GPP TS 36.211 V13.0.0 (Dec. 2015).
(Continued)

*Primary Examiner* — Samina F Choudhry
(74) *Attorney, Agent, or Firm* — ScienBiziP, P.C.

(57) ABSTRACT

A terminal apparatus and a base station apparatus are capable of efficiently communicating with each other. A terminal apparatus monitors an NB-PDCCH, performs a DRX functionality that controls monitoring of the NB-PDCCH, starts a downlink HARQ RTT timer, based at least on the NB-PDCCH indicating a downlink transmission, starts an uplink HARQ RTT timer, based at least on the NB-PDCCH indicating an uplink transmission, starts a drx-InactivityTimer, based at least on the downlink HARQ RTT timer expires, starts the drx-InactivityTimer, based at least on the uplink HARQ RTT timer expires, and stops the drx-InactivityTimer, based at least on the NB-PDCCH indicating the downlink transmission or the uplink transmission.

6 Claims, 12 Drawing Sheets

(51) Int. Cl.
*H04W 52/02* (2009.01)
*H04L 1/18* (2006.01)
*H04W 4/70* (2018.01)

(52) U.S. Cl.
CPC ......... *H04W 72/04* (2013.01); *H04W 72/042* (2013.01); *H04W 4/70* (2018.02); *H04W 52/0241* (2013.01); *Y02D 70/20* (2018.01); *Y02D 70/24* (2018.01)

(56) References Cited

OTHER PUBLICATIONS

3rd Generation Partnership Project; Technical Specification Group Radio Access Network; Evolved Universal Terrestrial Radio Access (E-UTRA); Multiplexing and channel coding (Release 13); 3GPP TS 36.212 V13.0.0 (Dec. 2015).

3rd Generation Partnership Project; Technical Specification Group Radio Access Network; Evolved Universal Terrestrial Radio Access (E-UTRA); Physical layer procedures (Release 13); 3GPP TS 36.213 V13.0.0 (Dec. 2015).

3rd Generation Partnership Project; Technical Specification Group Radio Access Network; Evolved Universal Terrestrial Radio Access (E-UTRA); Medium Access Control (MAC) protocol specification (Release 13); 3GPP TS 36.321 V13.0.0 (Dec. 2015).

3rd Generation Partnership Project; Technical Specification Group Radio Access Network; Evolved Universal Terrestrial Radio Access (E-UTRA); Radio Resource Control (RRC); Protocol specification (Release 13); 3GPP TS 36.331 V13.0.0 (Dec. 2015).

Status Report to TSG: NarrowBand IOT, RP-151931, Vodafone, Huawei, Ericsson,Qualcomm, 3GPP TSG RAN Meeting #70, Sitges, Spain, Dec. 7-10, 2015.

Ericsson: "Connected Mode DRX for NB-IoT", R2-160471, 3GPP TSG-RAN WG2 Meeting NB-IOT ad-hoc, Budapest, Hungary, Jan. 19-21, 2016.

Huawei: "Correction on MAC procedure and DRX related issues", R2-165813, 3GPP TSG-RAN WG2 Meeting #95, Gothenburg, Sweden, Aug. 22-26, 2016.

* cited by examiner

TERMINAL APPARATUS, COMMUNICATION METHOD, AND INTEGRATED CIRCUIT

TECHNICAL FIELD

The present invention relates to a terminal apparatus, a communication method, and an integrated circuit.

This application claims priority based on Japanese Patent Application No. 2016-015282 filed on Jan. 29, 2016, the contents of which are incorporated herein by reference.

BACKGROUND ART

The 3rd Generation Partnership Project (3GPP) has been making efforts to standardize a radio access method and a radio network for cellular mobile communications (hereinafter, referred to as "Long Term Evolution (LTE)", or "Evolved Universal Terrestrial Radio Access (EUTRA.)") (NPL 1, NPL 2, and NPL 3). In the LTE, a base station apparatus is also referred to as an evolved NodeB (eNodeB), and a terminal apparatus is also referred to as User Equipment (UE). The LTE is a cellular communication system in which multiple areas each covered by the base station apparatus are deployed to form a cellular structure. A single base station apparatus may manage multiple cells.

In 3GPP, efforts have been made to standardize Narrow band-Internet of Things (NB-IoT) in order to reduce costs of terminal apparatuses and power consumption of terminal apparatuses (NPL 6).

CITATION LIST

Non Patent Literature

NPL 1: "3GPP TS 36.211 V13.0.0 (2015-12)", 6 Jan. 2016.
NPL 2: "3GPP TS 36.212 V13.0.0 (2015-12)", 6 Jan. 2016.
NPL 3: "3GPP TS 36.213 V13.0.0 (2015-12)", 6 Jan. 2016.
NPL 4: "3GPP TS 36.321 V13.0.0 (2015-12)", 14 Jan. 2016.
NPL 5: "3GPP TS 36.331 V13.0.0 (2015-12)", 7 Jan. 2016.
NPL 6: Status Report for WI: Narrow Band IOT, RP-151931, Vodafone, Huawei, Ericsson, Qualcomm, 3GPP TSG RAN Meeting #70, Sitges, Spain, 7-10 Dec. 2015

SUMMARY OF INVENTION

Technical Problem

The present invention provides a terminal apparatus capable of efficiently communicating with a base station apparatus, a base station apparatus communicating with the terminal apparatus, a communication method used by the terminal apparatus, a communication method used by the base station apparatus, an integrated circuit mounted on the terminal apparatus, and an integrated circuit mounted on the base station apparatus. For example, the communication method used by the terminal apparatus may include a method for Discontinuous Reception (DRX).

Solution to Problem (1) According to some aspects of the present disclosure, the following measures are provided. Specifically, a first aspect of the present invention is a terminal apparatus including: a reception unit configured to monitor a Narrow band physical downlink control channel; and a medium access control layer processing unit configured to perform a DRX functionality that controls monitoring of the Narrow band physical downlink control channel, in which the medium access control layer processing unit starts a downlink HARQ RTT timer, based at least on the Narrow band physical downlink control channel indicating a downlink transmission, starts an uplink HARQ RTT timer, based at least on the Narrow hand physical downlink control channel indicating an uplink transmission, starts a drx-InactivityTimer, based at least on the downlink HARQ RTT timer expires, starts the drx-InactivityTimer, based at least on the uplink HARQ RTT timer expires, and stops the drx-InactivityTimer, based at least on the Narrow band physical downlink control channel indicating the downlink transmission or the uplink transmission.

(2) A second aspect of the present invention is a communication method used by a terminal apparatus, the communication method including the steps of: monitoring a Narrow band physical downlink control channel; performing a DRX functionality that controls monitoring of the Narrow band physical downlink control channel; starting a downlink HARQ RTT timer, based at least on the Narrow band physical downlink control channel indicating a downlink transmission; starting an uplink HARQ WIT timer, based at least on the Narrow band physical downlink control channel indicating an uplink transmission; starting a drx-InactivityTimer, based at least on the downlink HARQ RTT timer expires; starting the drx-InactivityTimer, based at least on the uplink HARQ RTT timer expires; and stopping the drx-InactivityTimer, based at least on the Narrow band physical downlink control channel indicating the downlink transmission or the uplink transmission.

Advantageous Effects of Invention

According to the present invention, the terminal apparatus and the base station apparatus are capable of efficiently communicating with each other.

DESCRIPTION OF EMBODIMENTS

Embodiments of the present invention will be described below.

Long Term Evaluation (LTE; trade name) and Narrow Band Internet of Things (NB-IoT) may be defined as different Radio Access Technologies (RATs). The NB-IoT may also be defined as a technology included in the LTE. The present embodiment is applied to the NB-IoT but may be applied to the LTE or any other RAT.

Figure 1:
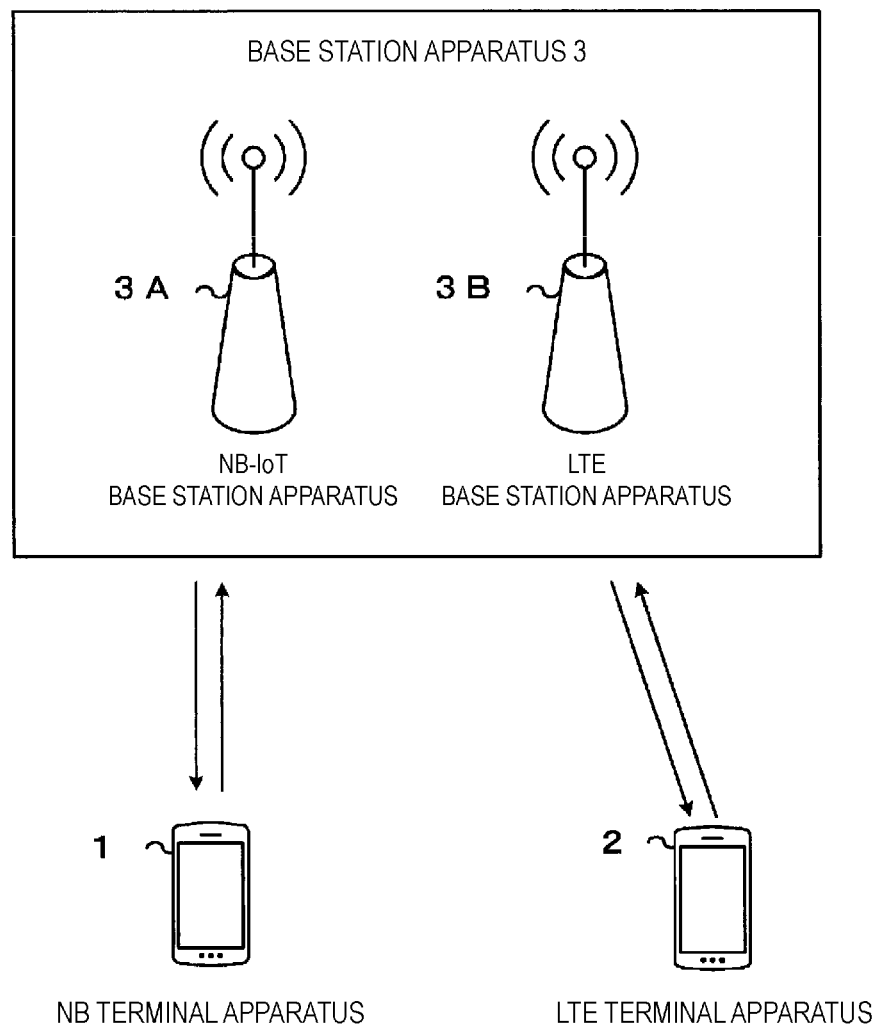
FIG. 1 is a conceptual diagram of a radio communication system according to the present embodiment.

FIG. 1 is a conceptual diagram of a radio communication system according to the present embodiment. In FIG. 1, the radio communication system includes an NB terminal apparatus 1, an LTE terminal apparatus 2, and a base station apparatus 3. The base station apparatus 3 includes an NB base station apparatus 3A and an LTE base station apparatus 3B. The NB base station apparatus 3A and the LTE base station apparatus 3B may be defined as different apparatuses. The base station apparatus 3 may include a core network apparatus.

The NB terminal apparatus 1 and the NB base station apparatus 3A support the NB-IoT. The NB terminal apparatus 1 and the NB base station apparatus 3A communicate with each other using the NB-IoT. The LTE terminal apparatus 2 and the LTE base station apparatus 3B support the LTE. The LTE terminal apparatus 2 and the LTE base station apparatus 3B communicate with each other using the LTE.

Time Division Duplex (TDD) and/or Frequency Division Duplex (FDD) is applied to the radio communication system according to the present embodiment. In the present embodiment, one serving cell is configured for the terminal apparatus 1. The serving cell configured for the terminal apparatus 1 is also referred to as an NB-IoT cell. The serving cell configured for the LTE terminal apparatus 2 is also referred to as an LTE cell.

The one serving cell configured may be one primary cell. The primary cell is a serving cell in which an initial connection establishment procedure has been performed, a serving cell in which a connection re-establishment procedure has been started, or a cell indicated as a primary cell during a handover procedure.

A carrier corresponding to a serving cell in a downlink is referred to as a downlink component carrier. A carrier corresponding to a serving cell in an uplink is referred to as an uplink component carrier. The downlink component carrier and the uplink component carrier are collectively referred to as a component carrier.

The present embodiment may be applied to three scenarios/modes: standalone, guard band, and in-band. In the standalone mode, a channel bandwidth of the NB-IoT cell is not included in a channel bandwidth of the LTE cell. In the guard band mode, the channel bandwidth of the NB-IoT cell is included in a guard band of the LTE cell. In the in-band mode, the channel bandwidth of the NB-IoT cell is included in a transmission bandwidth of the LTE cell. For example, the guard band of the LTE cell is a band included in the channel bandwidth of the LTE cell but not included in the transmission bandwidth of the LTE cell. The present embodiment is applicable to all the modes.

Figure 2:
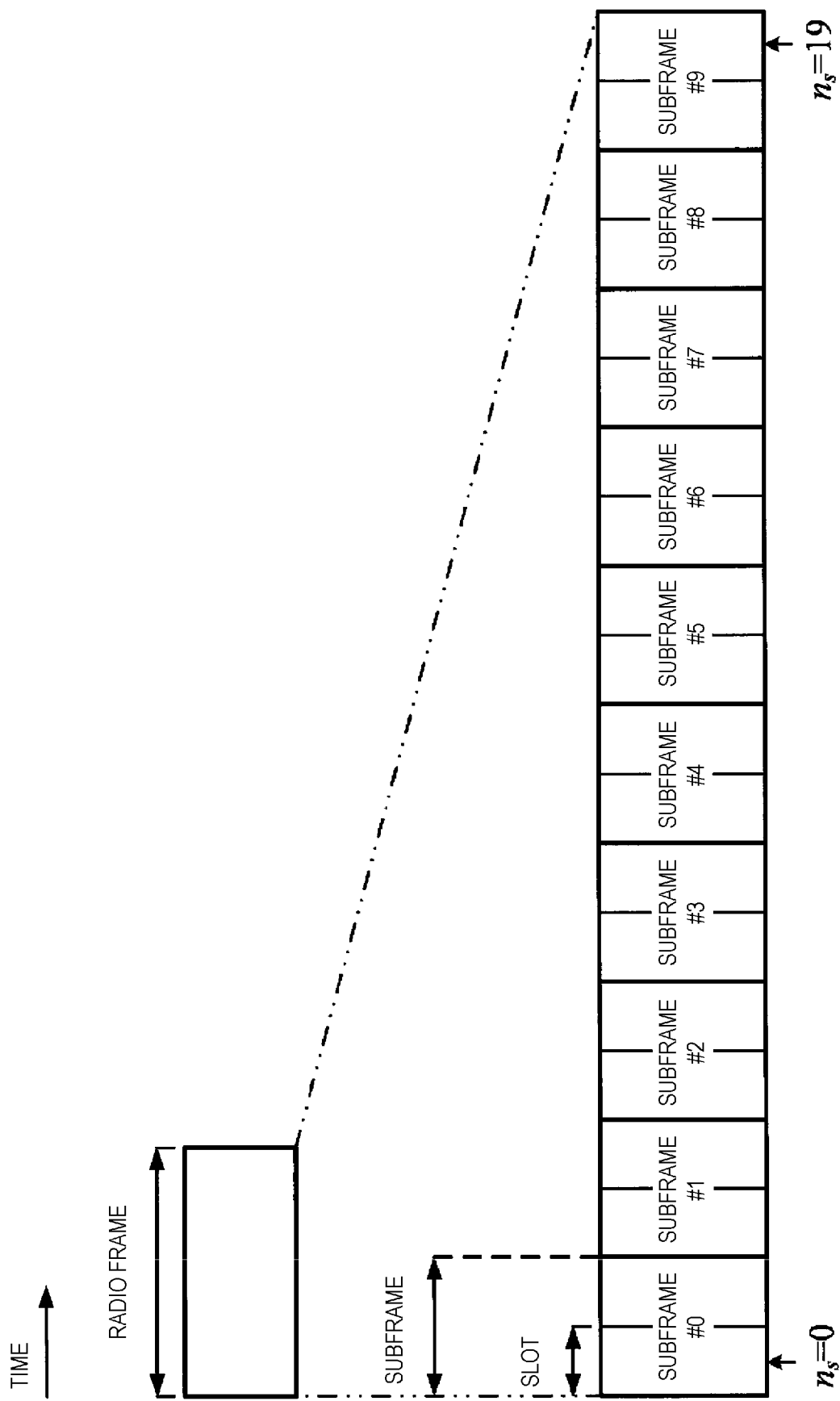
FIG. 2 is a diagram illustrating an example of a radio frame configuration according to the present embodiment.

FIG. 2 is a diagram illustrating an example of a radio frame configuration according to the present embodiment. In FIG. 2, the horizontal axis is a time axis.

Each radio frame may include 10 subframes that are consecutive in a time domain. Each subframe i may include two slots that are consecutive in the time domain. The two slots that are consecutive in the time domain may be a slot for which a slot number $n_s$ in the radio frame is $2i$ and a slot for which the slot number $n_s$ in the radio frame is $2i+1$. Each radio frame may include 10 subframes that are consecutive in the time domain. Each radio frame may include 20 slots that are consecutive in the time domain ($n_s$=0, 1, . . . , 19).

Figure 3:
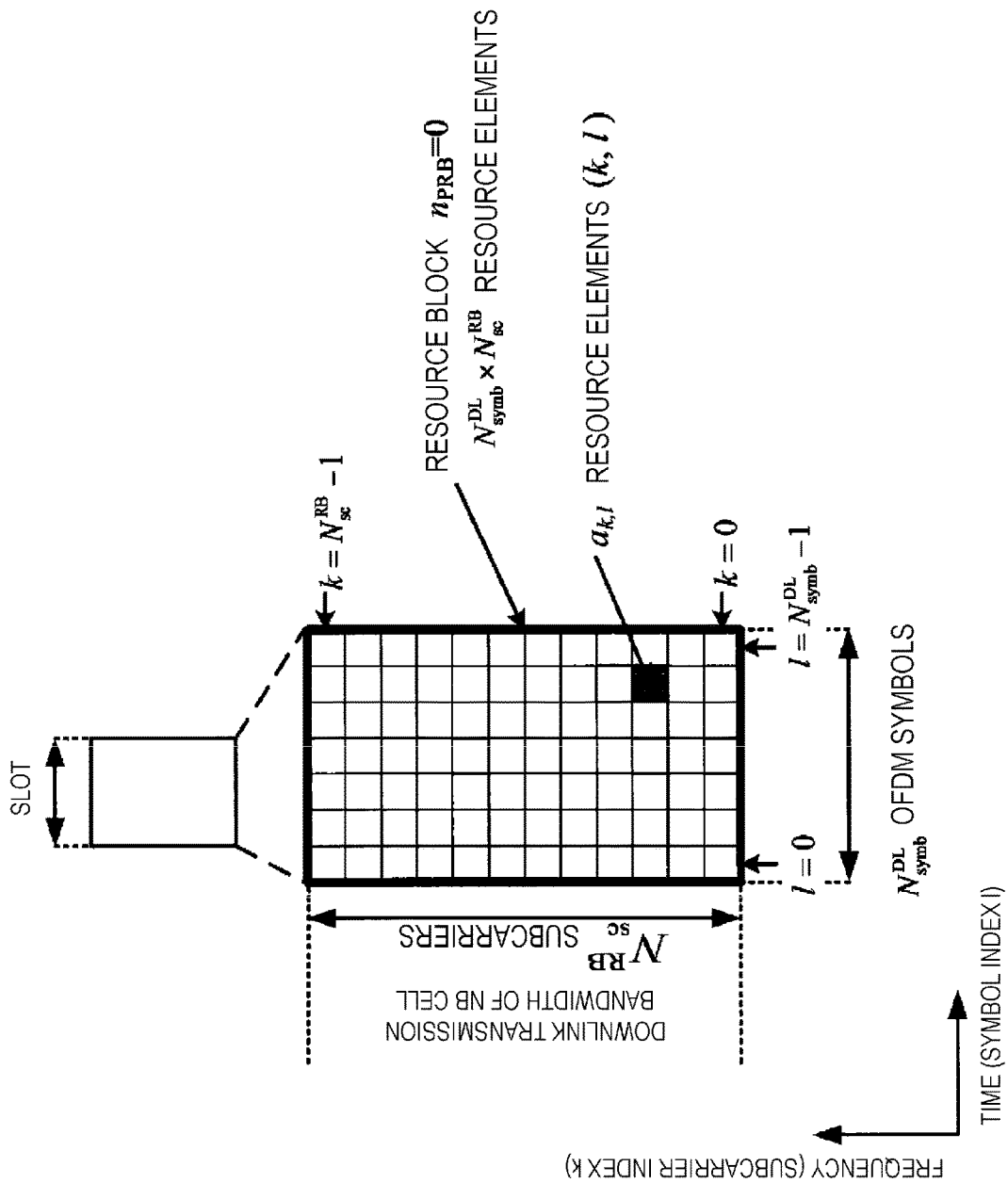
FIG. 3 is a diagram illustrating a schematic configuration of a downlink slot according to the present embodiment.

A configuration of a slot according to the present embodiment will be described below. FIG. 3 is a diagram illustrating a schematic configuration of a downlink slot according to the present embodiment. FIG. 3 illustrates a configuration of the downlink slot in one NB-IoT cell. In FIG. 3, the horizontal axis is a time axis, and the vertical axis is a frequency axis. In FIG. 3, l is an orthogonal frequency-division multiplexing (OFDM) symbol number/index, and k is a subcarrier number/index.

A physical signal or a physical channel transmitted in each of the slots is expressed by a resource grid. In the downlink, the resource grid is defined by multiple subcarriers and multiple OFDM symbols. Each element within the resource grid is referred to as a resource element. A resource element $a_{k,l}$ is represented by the subcarrier number/index k and the OFDM symbol/index l.

The resource grid is defined for each antenna port. In the present embodiment, the resource grid will be described for one antenna port. The present embodiment may be applied to each of multiple antenna ports.

A downlink slot includes multiple OFDM symbols l (l=0, 1, . . . , $N^{DL}_{symb}-1$) in the time domain. $N^{DL}_{symb}$ denotes the number of OFDM symbols included in one downlink slot. For a normal Cyclic Prefix (normal CP), $N^{DL}_{symb}$ is 7. For an extended Cyclic Prefix (extended CP), $N^{DL}_{symb}$ is 6.

The downlink slot includes multiple subcarriers k (k=0, 1, . . . , $N^{DL}_{RB} \times N^{RB}_{sc}$) in a frequency domain. $N^{DL}_{RB}$ is a downlink bandwidth configuration for the NB-IoT cell that is expressed by a multiple of $N^{RB}_{sc}$. The downlink bandwidth configuration for the NB-IoT cell is 1. $N^{RB}_{sc}$ is a (physical) resource block size in the frequency domain and is expressed by the number of subcarriers. In the downlink, a subcarrier spacing $\Delta f$ is 15 kHz, and $N^{RB}_{sc}$ is equal to 12 subcarriers. In other words, in the downlink, $N^{RB}_{sc}$ is equal to 180 kHz.

A resource block is used to express mapping of a physical channel to resource elements. For the resource block, a virtual resource block (VRB) and a physical resource block (PRB) are defined. A physical channel is first mapped to the virtual resource block. Thereafter, the virtual resource block is mapped to the physical resource block, One physical resource block is defined by $N^{DL}_{symb}$ consecutive OFDM symbols in the time domain and by $N^{RB}_{sc}$ consecutive subcarriers in the frequency domain. Hence, one physical resource block includes ($N^{DL}_{symb} \times N^{RB}_{sc}$) resource elements. One physical resource block corresponds to one slot in the time domain.

In the uplink, the subcarrier spacing $\Delta f$ is 15 kHz or 3.75 kHz, in a case that the subcarrier spacing $\Delta f$ is 15 kHz, the configuration of slots in the uplink is the same as the configuration of slots in the downlink. Here, OFDM may not be used in the uplink.

Uplink slots having an uplink subcarrier spacing Δf of 3.75 kHz will not be described below. However, the present embodiment may be applied to uplink slots having an uplink subcarrier spacing Δf of 3.75 kHz.

Figure 4:
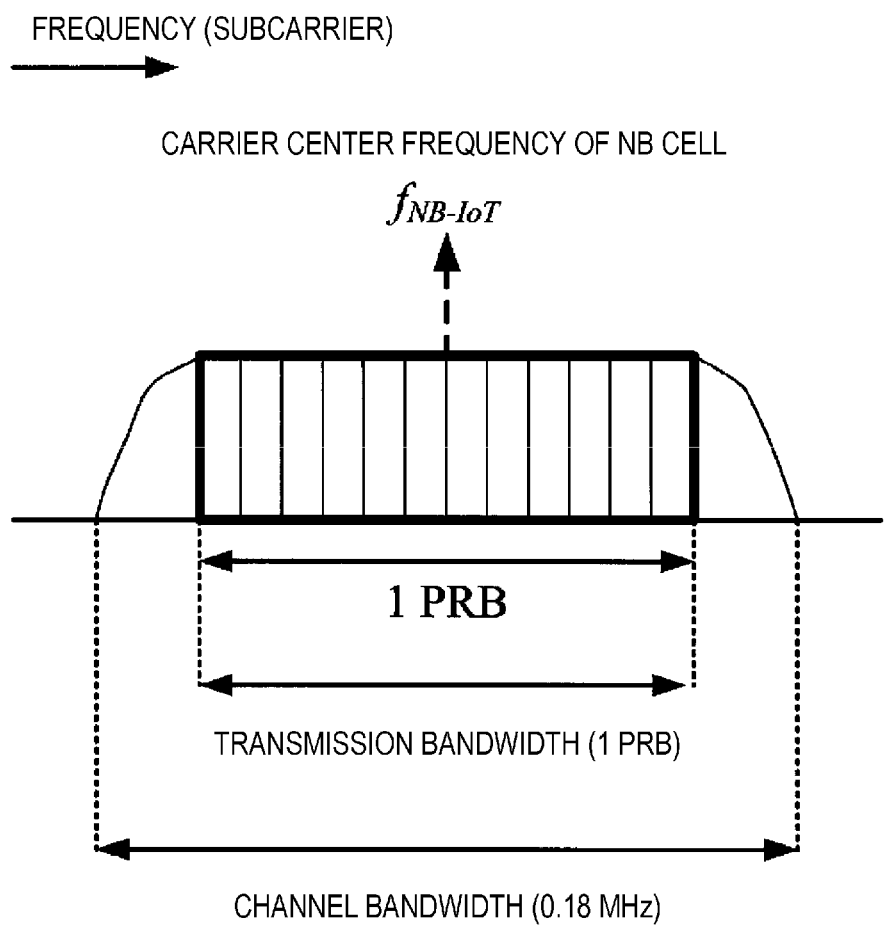
FIG. 4 is a diagram illustrating an example of a channel bandwidth configuration for an NB-IoT cell according to the present embodiment.

FIG. 4 is a diagram illustrating an example of a channel bandwidth configuration for the NB-IoT cell according to the present embodiment. In FIG. 4, the horizontal axis is a time axis. The NB-IoT cell has a transmission bandwidth of 1 PRB and a channel bandwidth of 200 kHz.

Physical channels and physical signals according to the present embodiment will be described.

In FIG. 1, the following downlink physical channels are used for downlink radio communication from the base station apparatus 3A to the terminal apparatus 1. The downlink physical channels are used by a physical layer to transmit information output from higher layers.

Narrow Band Physical Broadcast Channel (NB-PBCH)
Narrow Band Physical Downlink Control Channel (NR-PDCCH)
Narrow Band Physical Downlink Shared Channel (NB-PDSCH)

The NB-PBCH is used to broadcast system information commonly used by terminal apparatuses 1.

The NB-PDDCH is used to transmit downlink control information (Narrow Band Downlink Control Information (DCI)) used for scheduling of the NB-PDSCH and downlink control information used for scheduling of a Narrow Band Physical Uplink Shared Channel (NB-PUSCH). The downlink control information may include HARQ information. The HARQ information may include information indicating an initial transmission and a retransmission. The NB-PDCCH including information indicating an initial transmission is referred to as an initial-transmission indicating NB-PDCCH. The NB-PDCCH including information indicating a retransmission is referred to as a retransmission indicating NB-PDCCH.

The NB-PDSCH is used for transmission of downlink data (Downlink Shared Channel (DL-SCH)).

In FIG. 1, the following downlink physical signals are used for downhill radio communication from the base station apparatus 3A to the terminal apparatus 1. The downlink physical signals are not used to transmit the information output from the higher layer, but are used by the physical layer.

Narrow Band Synchronization Signal (NB-SS)
Narrow Band Downlink Reference Signal (NB-DL RS)
Narrow Band Downlink Reference Signal (NB-CRS)

The NB-SS is used by the terminal apparatus 1 for frequency and time synchronizations in the downlink of the NB-IoT cell.

The NB-DL RS may be used by the terminal apparatus 1 for channel compensation for the downlink physical channel of the NB-IoT cell. The NB-DL RS may be used by the terminal apparatus 1 to calculate downlink channel state information on the NB-IoT cell. Here, the NB-DL RS is used for channel compensation for an NB-PBCH.

The N B-CRS may be used by the terminal apparatus 1 for channel compensation for the downlink physical channel of the NB-IoT cell. The NB-CRS may be used by the terminal apparatus 1 to calculate the downlink channel state information on the NB-IoT cell. Here, the NB-CRS is not used for channel compensation for the NB-PBCH.

In FIG. 1, the following uplink physical channels are used for uplink radio communication from the base station apparatus 3A to the terminal apparatus 1. The uplink physical channels are used by the physical layer to transmit information output from higher layers.

Narrow Band Physical Random Access Channel (NB-PRACH)
Narrow Band Physical Uplink Shared Channel (NB-PUSCH)

The NB-PUSCH may be used for transmission of uplink data (Uplink-Shared Channel (UL-SCH)) and/or uplink control information. The uplink control information includes a Hybrid Automatic Repeat reQuest ACKnowledgement (HARQ-ACK) corresponding to the NB-PDSCH (downlink data).

In FIG. 1, the following uplink physical signal is used for uplink radio communication from the base station apparatus 3A to the terminal apparatus 1. The uplink physical signal is not used to transmit information output from the higher layer, but is used by the physical layer.

Narrow Band Downlink Reference Signal (NB-UL RS)

The NB-UL RS may be used by the base station apparatus 1 for channel compensation for the uplink physical channel of the NB-IoT cell. The NB-UL RS may be used by the terminal apparatus 1 to calculate uplink channel state information on the NB-IoT cell.

The downlink physical channels and the downlink physical signals are collectively referred to as the downlink signals. The uplink physical channels and the uplink physical signals are collectively referred to as the uplink signals. The downlink physical channels and the uplink physical channels are collectively referred to as the physical channels. The downlink physical signals and the uplink physical signals are collectively referred to as the physical signals.

The DL-SCH is a transport channel. A channel used in the Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport hock in the MAC layer. The transport block is a unit of data that the MAC layer delivers to the physical layer. In the physical layer, the transport block is mapped to a codeword and subjected to coding processing on a codeword-by-codeword basis.

The transport block may include data of a Signalling Radio Bearer (SRB) and data of a Data Radio Bearer (DRB). The SRB is defined as a radio bearer used only for transmission of a Radio Resource Control (RRC) message and, a Non Access Stratum (NAS) message. The DRB is defined as a radio bearer that transmits user data.

The base station apparatus 3 and the terminal apparatus 1 exchange (transmit and/or receive) signals with each other in the respective higher layers. For example, the base station apparatus 3 and the terminal apparatus 1 may transmit and/or receive, in a Radio Resource Control (RRC) layer, RRC signaling (also referred to as Radio Resource Control message (RRC, message) or Radio Resource Control information (RRC information)) to and from each other. The base station apparatus 3 and the terminal apparatus 1 may transmit and/or receive, in a Medium Access Control (MAC) layer, a MAC Control Element (CE). Here, the RRC signaling and/or the MAC CE is also referred to as higher layer signaling.

The NB-PDSCH is used to transmit the RRC signaling and the MAC CE. Here, the RRC signaling transmitted from the base station apparatus 3 on the NB-PDSCH may be signalling common to multiple terminal apparatuses 1 in a cell. The RRC signaling transmitted from the base station apparatus 3 on the NB-PDSCH may be signalling dedicated to a certain terminal apparatus 1 (also referred to as dedicated signaling or UE specific signaling). Cell-specific parameters may be transmitted using signaling common to multiple terminal apparatuses 1 in the cell or signalling dedicated to a certain terminal apparatus 1. UE-specific parameters may be transmitted through signalling dedicated to the certain terminal apparatus 1.

The physical channels corresponding to the same data (NB-PDCCH, NB-PDSCH, and NB-PUSCH) may be repeatedly transmitted in consecutive subframes. Repetition Levels (RLs) of the physical channels may be controlled for each physical channel. Repetition level 1 means that the physical channels corresponding to the same data are not repeatedly transmitted. Repetition levels higher than 1 mean that the physical channels corresponding to the same data are repeatedly transmitted. In other words, the repetition level is associated with the length of one transmission instance of a physical channel in the time domain.

The repetition level may be based at least on some or all of the downlink control information, the RRC signaling, the MAC CE, and a coverage level. The coverage level includes at least a first coverage level and a second coverage level. The coverage level may include three or more coverage levels.

The coverage level is associated with the repetition level. The terminal apparatus 1 for which the first coverage level is configured may transmit or receive physical channels with repetition level X or a lower repetition level. The terminal apparatus 1 for which the first coverage level is configured may not transmit or receive physical channels with a repetition level higher than X. The terminal apparatus 1 for which the second coverage level is configured may transmit or receive physical channels with a repetition level higher than X. For example, X may be 1 or 3.

The terminal apparatus 1 may configure the coverage level, based on information received from the base station apparatus 3. The terminal apparatus 1 may select the coverage level during a cell selection procedure, a cell reselection procedure, or a random access procedure. The terminal apparatus 1 may select the coverage level during the cell selection procedure, the cell reselection procedure, or the random access procedure, based on the information received from the base station apparatus 3. The information may be the downlink control information, the RRC signaling, or the MAC CE.

During the cell selection procedure or the cell reselection procedure, the terminal apparatus 1 may attempt to detect a cell satisfying a first condition, based on a parameter corresponding to the first coverage level. In a case that the cell satisfying the first condition is selected, the terminal apparatus 1 may set the first coverage level. In a case that the cell satisfying the first condition fails to be detected, the terminal apparatus 1 may attempt to detect a cell satisfying a second condition, based on a parameter corresponding to the second coverage level. In a case that the cell satisfying the second condition is selected, the terminal apparatus 1 may set the second coverage level.

For example, the terminal apparatus 1 may set the first coverage level and perform the random access procedure, based on the parameter corresponding to the first coverage level. In a case that the random access procedure based on the parameter corresponding to the first range level fails, the terminal apparatus 2 may set the second coverage level and perform the random access procedure, based on the parameter corresponding to the second coverage level.

The parameter corresponding to the first coverage level and the parameter corresponding to the second coverage level may be pre-configured in, e.g., a memory provided in the terminal apparatus 1. The base station apparatus 3 may broadcast/transmit information indicating the parameter corresponding to the first coverage level and information indicating the parameter corresponding to the second coverage level.

The terminal apparatus 1 may configure the coverage level, based on measurement of any of the downlink signals (downlink measurement).

A MAC layer of the terminal apparatus 1 (HARQ entity) and a MAC layer of the base apparatus 3 (HARQ entity) manage one HARQ process in the downlink. The MAC layer of the terminal apparatus 1 and the MAC layer of the base station apparatus 3 manage one HARQ process in the uplink. The HARQ process in the downlink is also referred to as a downlink HARQ process. The HARQ process in the uplink is also referred to as an uplink HARQ process. The downlink HARQ process controls the HARQ of one piece of downlink data (transport block). The uplink HARQ process controls the HARQ of one piece of uplink data (transport block).

Each of the MAC layer of the terminal apparatus 1 (HARQ entity) and the MAC layer of the base station apparatus 3 (HARQ entity) may further manage one broadcast HARQ process. The broadcast HARQ process may be associated with system information broadcasted by the base station apparatus 3.

Now, Discontinuous Reception (DRX) according to the present embodiment will be described.

A DRX functionality is configured by a higher layer (RRC) and processed through MAC. The DRX functionality controls a PDCCH monitoring activity of the terminal apparatus 1 for a Cell Radio Network Temporary identifier (C-RNTI) of the terminal apparatus 1. In other words, the DRX functionality controls the monitoring activity of the terminal apparatus 1 for the NB-PDCCH to be used to transmit the downlink control information to which Cyclic Redundancy Check (CRC) parity bits scrambled with the C-RNTI of the terminal apparatus 1 are attached. The C-RNTI is an identifier for uniquely identifying the terminal apparatus 1 within the cell.

With the configured DRX, the terminal apparatus 1 may discontinuously monitor the NB-PDCCH through a DRX operation to be described below. In other cases, the terminal apparatus 1 may continuously monitor the NB-PDCCH.

The higher layer (RRC) controls the DRX operation by configuring values of the following multiple timers and a drxStartOffset.

onDurationTimer
drx-InactivityTimer
drx-RetransmissionTimer
longDRX-Cycle
HARQ Round Trip Time (RTT) timer Once each of the timers starts, the timer keeps running until the timer is stopped or expires. In other cases, the timer is not running. When the timer is not running, the timer has a possibility to be started. When the timer is running, the timer has a possibility to be restarted. The timer is always to be started or restarted from an initial value of the timer.

The base station apparatus 3 may transmit, to the terminal apparatus 1, an RRC message including parameters/information indicating the values of the onDurationTimer, the drx-InactivityTimer, the drx-RetransmissionTimer, the longDRX-Cycle, and the drxStartOffset. The terminal apparatus 1 may set the values of the onDurationTimer, the drx-InactivityTimer, the drx-RetransmissionTimer, the longDRX-Cycle, and the drxStartOffset, based on the received RRC message. The longDRX-Cycle is also referred to as a DRX cycle.

The onDurationTimer indicates the number of consecutive NB-PDCCH subframes from the start of a DRX cycle.

The drx-InactivityTimer may be common to the uplink, and the downlink. The drx-InactivityTimer common to the uplink and the downlink is simply referred to as the drx-InactivityTimer. The drx-InactivityTimer indicates the number of consecutive NB-PDCCH subframes subsequent to the subframe to which the NB-PDCCH indicating an initial transmission of uplink data or downlink data to the terminal apparatus 1 is mapped.

The drx-InactivityTimer may be defined separately for the uplink and for the downlink. The drx-InactivityTimer for the uplink is referred to as an UL-drx-InactivityTimer. The UL-drx-InactivityTimer indicates the number of consecutive NB-PDCCH subframes subsequent to the subframe to which the NB-PDCCH indicating an initial transmission or uplink data to the terminal apparatus 1 is mapped. The drx-InactivityTimer for the downlink is referred to as a DL-drx-InactivityTimer. The DL-drx-InactivityTimer indicates the number of consecutive NB-PDCCH subframes subsequent to the subframe to which the NB-PDCCH indicating an initial transmission of downlink data to the terminal apparatus 1 is mapped. The same value may be applied to the UL-drx-InactivityTimer and to the DL-drx-InactivityTimer. In other words, the base station apparatus 3 may transmit, to the terminal apparatus 1, an RRC message including a parameter/information indicating one value applied to both the UL-drx-InactivityTimer and the DL-drx-InactivityTimer. The value of the UL-drx-InactivityTimer and the value of the DL-drx-InactivityTimer may be separately configured. In other words, the base station apparatus 3 may transmit, to the terminal apparatus 1, an RRC message including both a parameter/information indicating one value applied to the UL-drx-InactivityTimer and a parameter/information indicating one value applied to the DL-drx-InactivityTimer The value of the drx-InactivityTimer, the value of the UL-drx-InactivityTimer, and the value of the DL-drx-InactivityTimer may be 0.

The drx-RetransmissionTimer indicates the maximum number of consecutive NB-PDCCH subframes for a downlink retransmission or an uplink retransmission expected by the terminal apparatus 1. The drx-RetransmissionTimer may be defined separately for the uplink and for the downlink. The drx-RetransmissionTimer for the uplink is referred to as an UL-drx-RetransmissionTimer The drx-RetransmissionTimer for the downlink is referred to as a DL-drx-RetransmissionTimer. The same value may be applied to the UL-drx-RetransmissionTimer and to the DL-drx-RetransmissionTimer. In other words, the base station apparatus 3 may transmit, to the terminal apparatus 1, an RRC message including a parameter/information indicating one value applied to both the UL-drx-RetransmissionTimer and the DL-drx-RetransmissionTimer. The value of UL-drx-RetransmissionTimer and the value of the DL-drx-RetransmissionTimer may be separately configured. In other words, the base station apparatus 3 may transmit, to the terminal apparatus 1, an RRC message including both a parameter/information indicating one value applied to the UL-drx-RetransmissionTimer and a parameter/information indicating one value applied to the DL-drx-RetransmissionTimer. The value of the drx-RetransmissionTimer, the value of the UL-drx-RetransmissionTimer and the value of the DL-drx-RetransmissionTimer may be 0.

The DRX cycle indicates an On Duration iteration cycle. An on-duration period is followed by a period in which NB-PDCCH monitoring inactivity of the terminal apparatus 1 for the C-RNTI of the terminal apparatus 1 is enabled.

The drxStartOffset indicates the subframe in which the DRX cycle starts.

Figure 5:
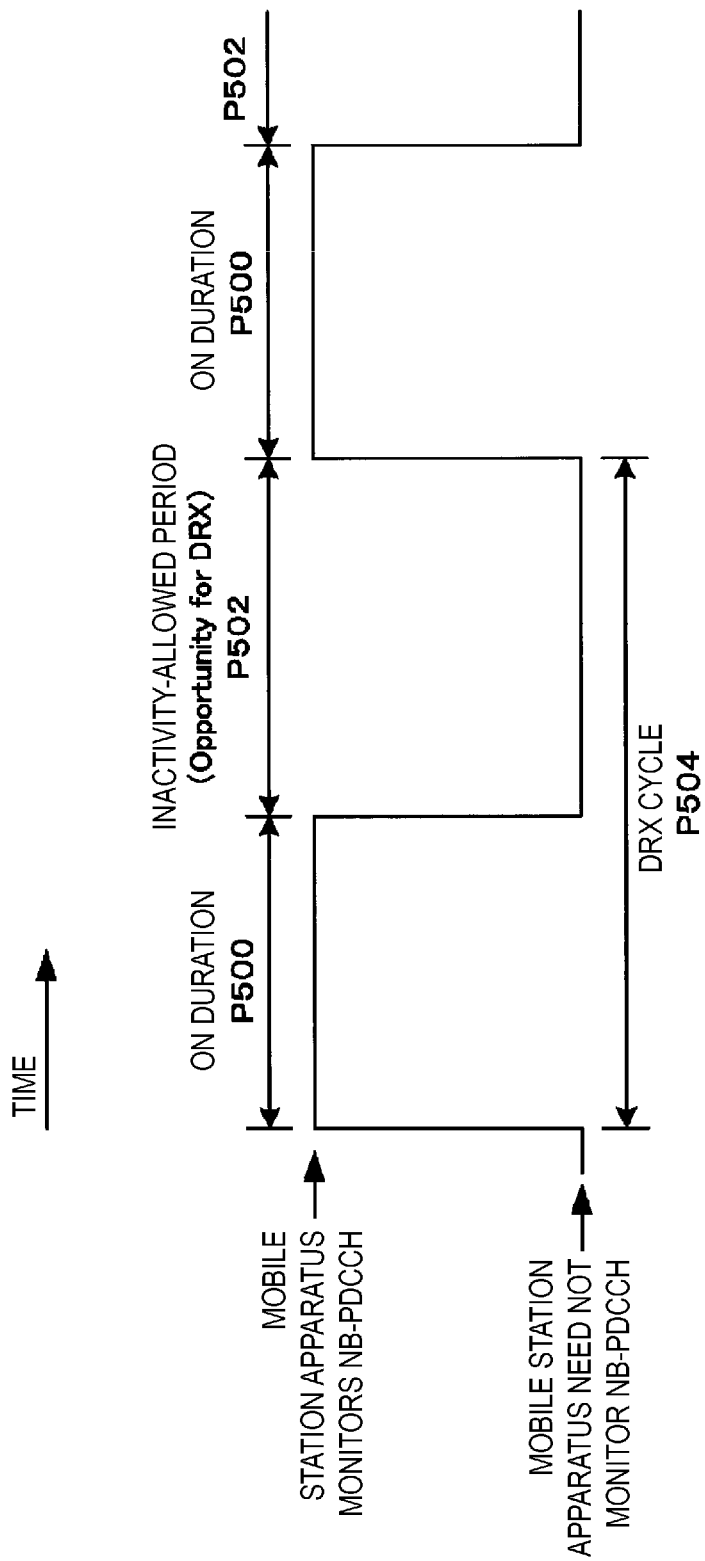
FIG. 5 is a diagram illustrating an example of a DRX cycle according to the present embodiment.

FIG. 5 is a diagram illustrating an example of the DRX cycle in the present embodiment. In FIG. 5, the horizontal axis is a time axis. In FIG. 5, the terminal apparatus 1 monitors the NB-PDCCH in an on-duration period P500. In FIG. 5, a period P502 subsequent to the on-duration period P500 is a period when PDCCH monitoring inactivity of the terminal apparatus 1 for the C-RNTI is enabled. In other words, in FIG. 5, the terminal apparatus 1 may not monitor the NB-PDCCH for the C-RNTI in the period P502.

In a case that the DRX cycle is configured, an Active Time may include a period satisfying condition (a) described below. The Active Time may include a period satisfying a condition other than condition (a).

Figure 6:
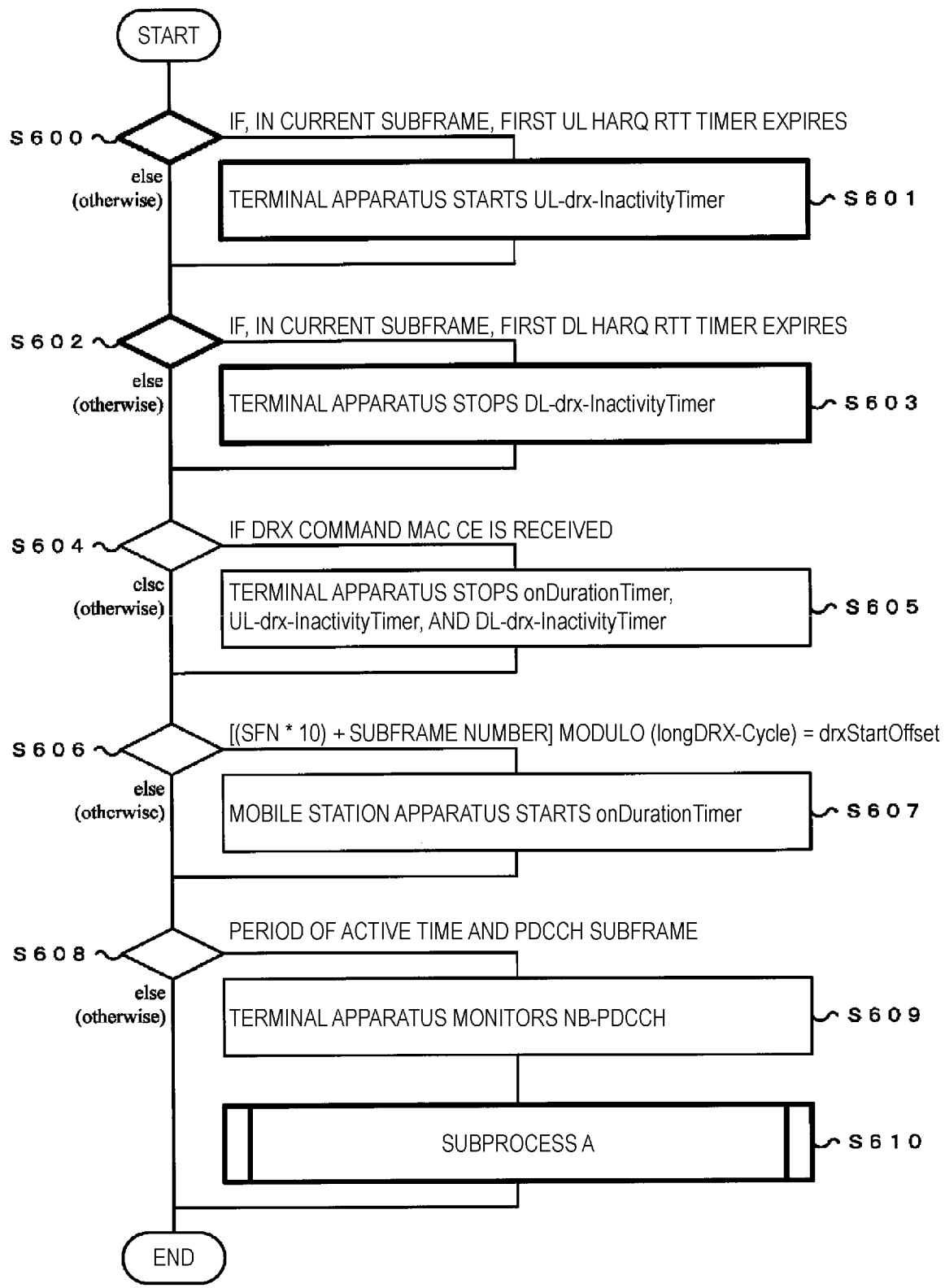
FIG. 6 is a flowchart illustrating a first example of a DRX operation according to the present embodiment.

Condition (a): the onDurationTimer the drx-InactivityTimer, the UL-drx-InactivityTimer, the DL-drx-InactivityTimer, the drx-RetransmissionTimer, the UL-drx-RetransmissionTimer, the DL-drx-RetransmissionTimer, or a mac-ContentionResolutionTimer is running FIG. 6 is a flowchart illustrating a first example of the DRX operation according to the present embodiment. In a case that the DRX is configured, the terminal apparatus 1 may perform the DRX operation on each of the subframes according to the flowchart in FIG. 6. In the first example, the UL-drx-InactivityTimer and the DL-drx-InactivityTimer are used. In the first example, instead of the UL-drx-InactivityTimer and the DL-drx-InactivityTimer, the drx-InactivityTimer, which is common to the uplink and the downlink, may be used. In the first example, the drx-InactivityTimer may be started/stopped, instead of starting/stopping the UL-drx-InactivityTimer and the DL-drx-InactivityTimer.

In a case that, in the current subframe, a first UL HARQ RTT timer corresponding to the uplink HARQ process expires (S600), the terminal apparatus 1 starts the UL-drx-InactivityTimer for the uplink HARQ process corresponding to UL HARQ RTT timer (S601), and then proceeds to S602. Otherwise (S600), the terminal apparatus 1 proceeds to S602.

In a case that, the first DL HARQ RTT timer corresponding to the downlink HARQ process in the current subframe expires (S602), the terminal apparatus 1 starts the DL-drx-InactivityTimer for the downlink HARQ process corresponding to the DL HARQ RTT timer (S603), and then proceeds to S604. Otherwise (S602), the terminal apparatus 1 proceeds to S604.

If a DRX command MAC CE is received (S604), the terminal apparatus 1 stops the onDurationTimer, the UL-drx-InactivityTimer, and the DL-drx-InactivityTimer (S605), and then proceeds to S606. Otherwise (S604), the terminal apparatus 1 proceeds to S606.

In a case that [(SFN*10)+subframe number] modulo longDRX-Cycle)=drxStartOffset (S606), the terminal apparatus 1 starts the onDurationTimer (S607), and then proceeds to S608. Otherwise (S606), the terminal apparatus 1 proceeds to S608. Here, the System Frame Number (SFN) is a radio frame number. The subframe number is the number of a subframe in one radio frame. The subframe number may be expressed using a slot number $n_s$ in the radio frame. The subframe number is floor $(n_s/2)$. The floor (X) is a function that outputs the largest integer smaller than an input value X.

If conditions are satisfied (S608), the terminal apparatus 1 monitors the NB-PDCCH in the current subframe (609) and then proceeds to S610. The conditions may include following conditions (b) and (c). The conditions may include conditions, other than conditions (b) and (c).

Condition (a): the current subframe is included in an Active Time period

Condition (b): the current subframe is a PDCCH subframe

Condition (c): the current subframe is not a part or a configured measurement gap.

For one FDD serving cell, all subframes may be PDCCH subframes. For one FDD serving cell, the subframe indicated by the system information transmitted/broadcasted by the base station apparatus 3 may be a PDCCH subframe. The terminal apparatus 1 and the base station apparatus 3 may identify a PDCCH subframe for a TDD serving cell, based on the configuration. The terminal apparatus 1 communicating with the base station apparatus 3 through one TDD serving cell, and the base station apparatus 3 may identify, as a PDCCH subframe, the subframe indicated as a downlink subframe or a subframe including DwPTS in the UL-DL configuration corresponding to the serving cell.

The measurement gap is a time interval for the terminal apparatus 1 to perform measurements for cells operating on different frequencies and/or different Radio Access Technologies (RATs). The base station apparatus 3 transmits information indicating the period of the measurement gap to the terminal apparatus 1. On the basis of the information, the terminal apparatus 1 configures the period of the measurement gap. The terminal apparatus 1 may not configure the measurement gap.

If at least one of the conditions in S608 are not satisfied (S608), the terminal apparatus 1 terminates the DRX operation on the current subframe. In other words, when at least one of the conditions in S608 is not satisfied, the terminal apparatus 1 need not monitor the NB-PDCCH in the current subframe.

Figure 7:
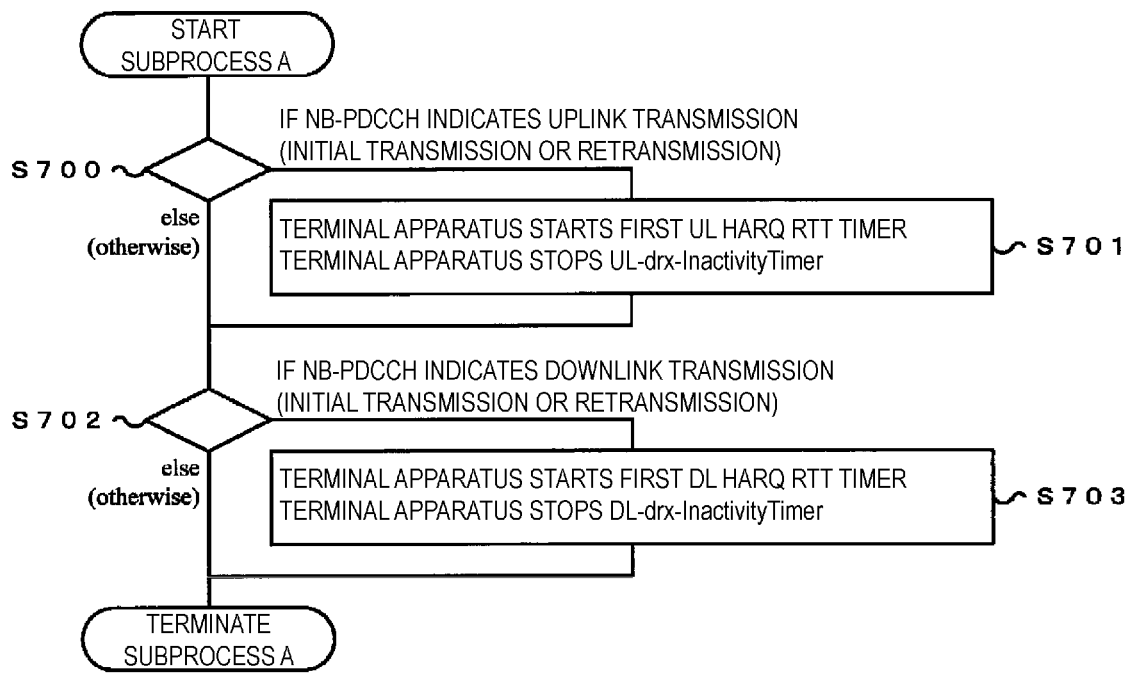
FIG. 7 is a flowchart illustrating an example of a subprocess A in the first example of the DRX operation according to the present embodiment.

In S610, the terminal apparatus 1 performs a subprocess A and terminates the DRX operation on the current subframe. FIG. 7 is a flowchart illustrating an example of the subprocess A in the first example of the DRX operation according to the present embodiment.

In a case that the downlink control information received via the NB-PDCCH indicates an uplink transmission (S700), the terminal apparatus 1 starts the first UL HARQ RTT timer for the corresponding uplink HARQ process, stops the UL-drx-inactivityTimer for the corresponding uplink HARQ process (S701), and then proceeds to S702. Otherwise (S700), the terminal apparatus 1 proceeds to S702. The uplink transmission in S700 may be an initial transmission. The uplink transmission in S700 may be a retransmission. The uplink transmission in S700 may be a transmission of the NB-PUSCH including the uplink data.

In a case that the downlink control information received via the NB-PDCCH indicates a downlink transmission (S702), the terminal apparatus 1 starts the first DL HARQ RTT timer for the corresponding downlink HARQ process and stops the DL-drx-InactivityTimer for the corresponding downlink HARQ process (S703). The terminal apparatus 1 then terminates the processing of the subprocess A. Otherwise (S702), the terminal apparatus 1 terminates the processing of the subprocess A. The downlink transmission in S702 may be an initial transmission. The downlink transmission in S702 may be a retransmission. The downlink transmission in S702 may be a transmission of the NB-PDSCH including the downlink data.

Figure 8:
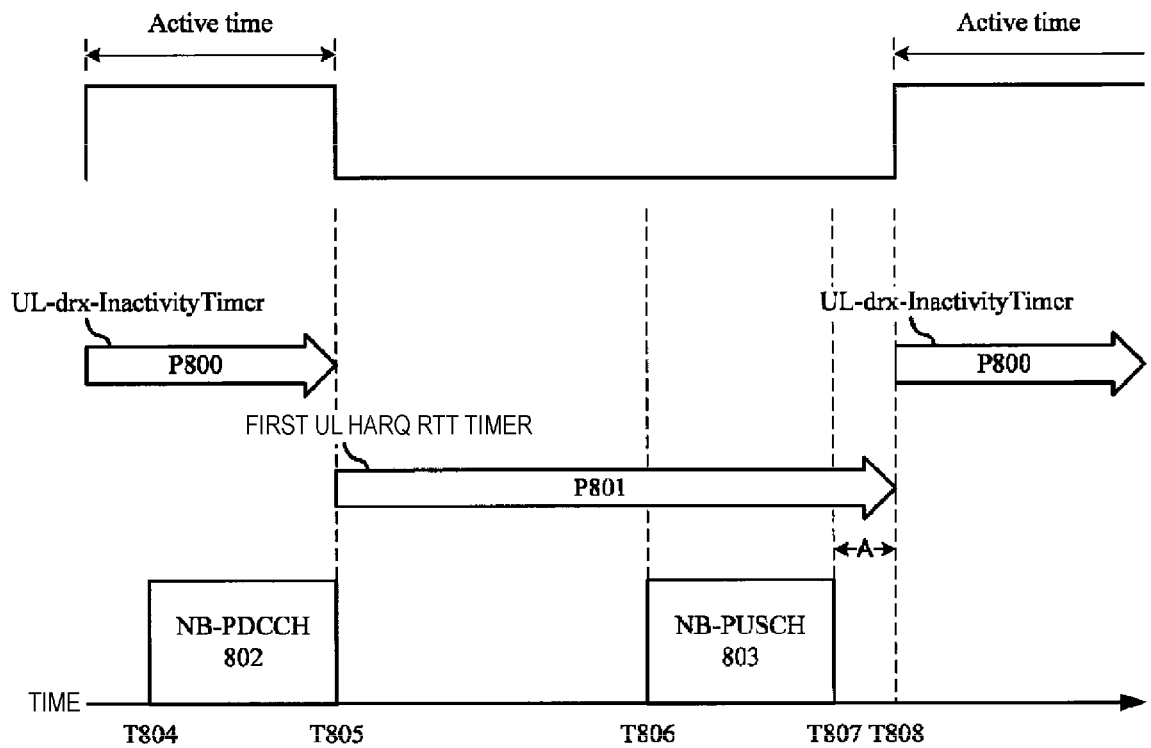
FIG. 8 is a flowchart illustrating an example of a UL-drx-InactivityTimer in the first example of the present embodiment.

FIG. 8 is a flowchart illustrating an example of the UL-drx-InactivityTimer in a first example of the present embodiment. In FIG. 8, the horizontal axis is a time axis. In FIG. 8, P800 is a period when the UL-drx-InactivityTimer is running, and P801 is a period when the first UL HARQ RTT timer is running. In FIG. 8, an NB-PDCCH 802 corresponds to a transmission of an NB-PUSCH 803 (uplink transmission). The NB-PUSCH 803 transmits at least the uplink data. The terminal apparatus 1 may stop the UL-drx-InactivityTimer in the last subframe where the NB-PDCCH 802 is received/detected or a subframe subsequent to the last subframe. The terminal apparatus 1 may start the first UL HARQ RTT timer in the last subframe where the NB-PDCCH 802 is received/detected or the subframe subsequent to the last subframe. The terminal apparatus 1 may start the UL-drx-InactivityTimer in a subframe where the first UL HARQ RTT timer expires or a subframe subsequent the subframe.

The first UL HARQ RTT timer may be set to expire in the last subframe where an NB-PUSCH 803 is transmitted or the subframe located A subframes after the last subframe. The value A may be predefined in the specifications or the like. The value A may be provided based on information (RRC message and/or downlink control information) received from the base station apparatus 3, the coverage level, the repetition level of the NB-PDCCH 802, and/or the repetition level of the NB-PUSCH 803.

The terminal apparatus 1 may start the UL-drx-InactivityTimer, based on the transmission of the NB-PUSCH 803. The terminal apparatus 1 may start the UL-drx-InactivityTimer in the last subframe where the NB-PUSCH 803 is transmitted or the subframe located A subframes after the last subframe. In this case, the first UL HARQ RTT timer may not be used.

Figure 9:
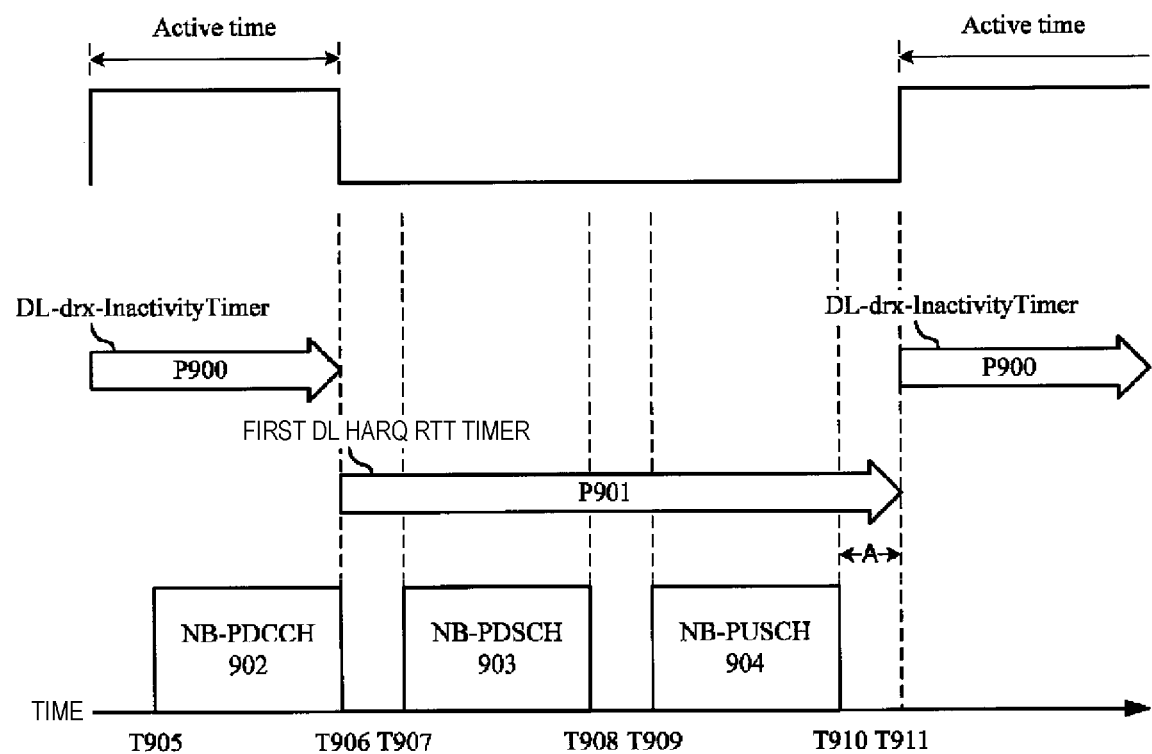
FIG. 9 is a flowchart illustrating an example of a DL-drx-InactivityTimer in the first example of the present embodiment.

FIG. 9 is a flowchart illustrating an example of a DL-drx-InactivityTimer in the first example of the present embodiment. In FIG. 9, the horizontal axis is a time axis. In FIG. 9, P900 is a period when the DL-drx-InactivityTimer is running, and P901 is a period when the first DL HARQ RTT timer is running. In FIG. 9, an NB-PDCCH 902 corresponds to a transmission of an NB-PDSCH 903 (downlink transmission). An NB-PUSCH 904 transmits a HARQ-ACK corresponding to the NB-PDSCH 903. The terminal apparatus 1 may stop the DL-drx-InactivityTimer in the last subframe where the NB-PDCCH 902 is received/detected or the subframe subsequent to the last subframe. The terminal apparatus 1 may start the first DL HARQ RTT timer in the last subframe where the NB-PDCCH 902 is received/detected or the subframe subsequent to the last subframe. The terminal apparatus 1 may start the DL-drx-InactivityTimer in the subframe where the first DL HARQ RTT timer expires or the subframe subsequent to the subframe.

The first DL HARQ RTT timer may be set to expire in the last subframe where the NB-PUSCH 904 is transmitted or the subframe located A subframes after the last subframe. The value A may be predefined in the specifications or the like. The value A may be provided based on the information (RRC message and/or downlink control information) received from the base station apparatus 3, the coverage level, the repetition level of the NB-PDCCH 902, the repetition level of the NB-PDSCH 903, and/or the repetition level of the NB-PUSCH 904. The value A in FIG. 8 may be the same as the value A in FIG. 9. In other words, the value A in FIG. 8 and the value A in FIG. 9 may be calculated based on the same method.

The terminal apparatus 1 may start the DL-drx-InactivityTimer, based on the transmission of the NB-PUSCH 904.

The terminal apparatus 1 may start the DL-drx-InactivityTimer in the last subframe where the NB-PUSCH 904 is transmitted or the subframe located A subframes after the last subframe. In this case, the first DL HARQ RTT timer may not be used.

The first DL HARQ RTT timer may be set to expire in the last subframe where the NB-PDSCH 903 is received or the subframe located A subframes after the last subframe.

The terminal apparatus 1 may start the DL-drx-InactivityTimer, based on reception of the NB-PDSCH 903. The terminal apparatus 1 may start the DL-drxInactivityTimer in the last subframe where the NB-PDSCH 903 is received or the subframe located A subframes after the last subframe. In this case, the first DL HARQ RTT timer may not be used.

Whether the terminal apparatus 1 starts the DL-drx-InactivityTimer, based on the reception of the NB-PDSCH 903 or the transmission of the NB-PUSCH 904 may be determined based on the information (RRC message and/or downlink control information) received from the base station apparatus 3, the coverage level, the repetition level of each physical channel, subcarrier spacings of the NB-PUSCH, and/or an assignment mode for NB-PUSCH resources. The assignment mode for NB-PUSCH resources may be associated with the subcarrier spacings of the NR-PUSCH.

Figure 10:
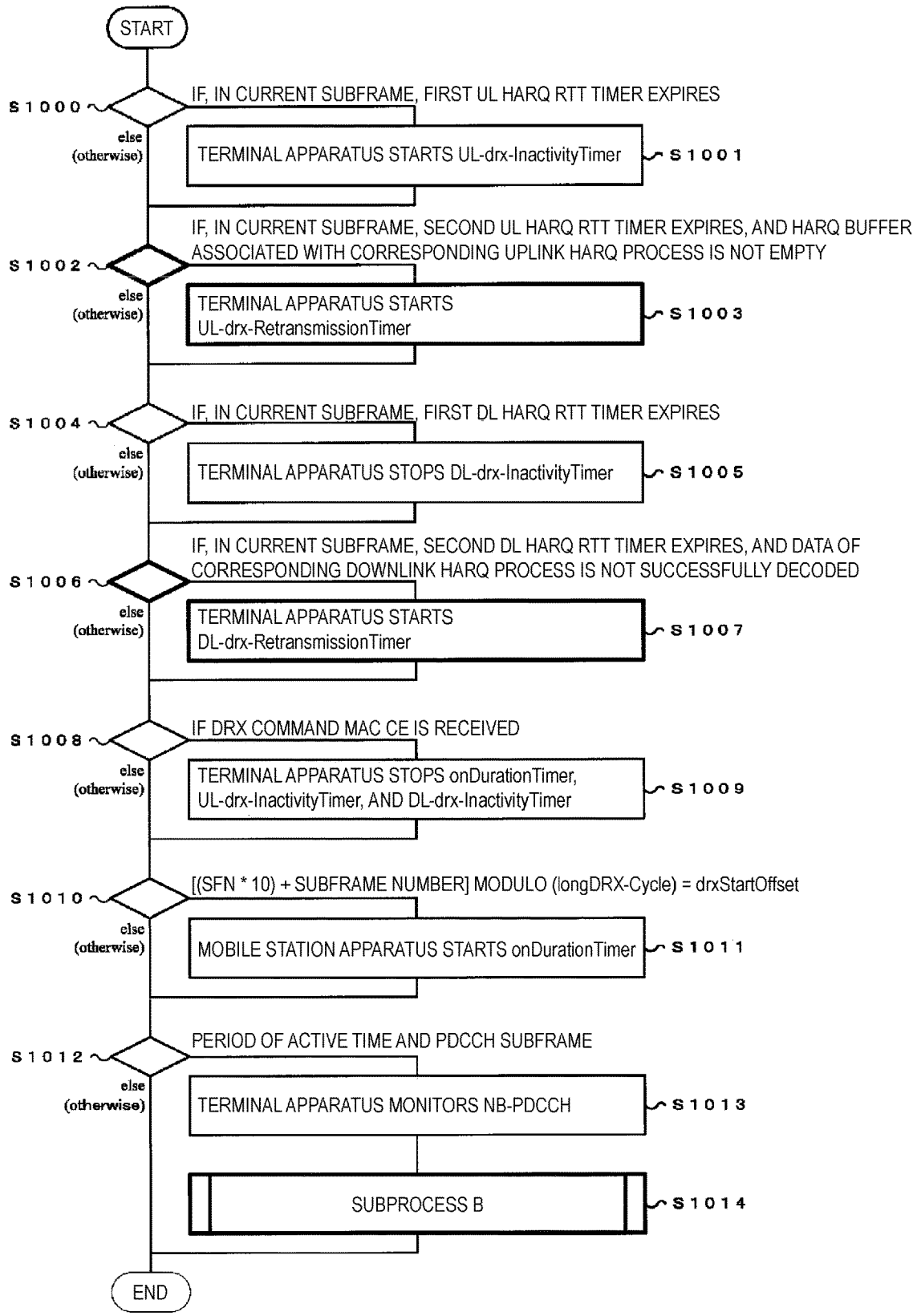
FIG. 10 is a flowchart illustrating a second example of the DRX operation according to the present embodiment.

FIG. 10 is a flowchart illustrating a second example of the DRX operation according to the present embodiment. In a case that the DRX is configured, the terminal apparatus 1 may perform the DRX operation on each subframe according to the flowchart in FIG. 10. In the second example, the UL-drx-InactivityTimer and the DL-drx-InactivityTimer are used. In the second example, instead of the UL-drx-InactivityTimer and the DL-drx-InactivityTimer, the drx-InactivityTimer, which is common to the uplink and the downlink, may be used. In the second example, the drx-InactivityTimer may be started/stopped, instead of starting/stopping the UL-drx-InactivityTimer and the DL-drx-InactivityTimer. In the second example, the UL-drx-RetransmissionTimer and the DL-drx-RetransmissionTimer are used. In the second example, instead of the UL-drx-RetransmissionTimer and the DL-drx-RetransmissionTimer, the drx-RetransmissionTimer, which is common to the uplink and the downlink, may be used. In the second example, the drx-RetransmissionTimer may be started/stopped instead of staring/stopping the UL-drx-RetransmissionTimer and the DL-drx-RetransmissionTimer.

In a case that, in the current subframe, the first UL HARQ RTT timer corresponding to the uplink HARQ process expires (S1000), the terminal apparatus 1 starts the UL-drx-InactivityTimer for the uplink HARQ process corresponding to the UL HARQ RTT timer (S1001), and then proceeds to S1002. Otherwise (S1000), the terminal apparatus 1 proceeds to S1002.

In a case that, in the current subframe, a second UL HARQ RTT timer corresponding to the uplink HARQ process expires and a HARQ buffer associated with the uplink HARQ process is not empty (S1002), the terminal apparatus 1 starts the UL-drx-RetransmissionTimer for the uplink HARQ process corresponding to the UL HARQ RTT timer (S1003), and then proceeds to S1004. Otherwise (S1002), the terminal apparatus 1 proceeds to S1004.

In a case that, in the current subframe, the first DL HARQ RTT timer corresponding to the downlink HARQ process expires (S1004), the terminal apparatus 1 starts the DL-drx-InactivityTimer for the downlink HARQ process corresponding to the DL HARQ RTT timer (S1005), and then proceeds to S1006. Otherwise (S1004), the terminal apparatus 1 proceeds to S1006.

In a case that, in the current subframe, a second DL HARQ RTT timer corresponding to the downlink HARQ process expires and the data of the downlink HARQ process is not decoded successfully (S1006), the terminal apparatus 1 starts the DL-drx-RetransmissionTimer for the downlink HARQ process corresponding to the DL HARQ RTT timer (S1007), and then proceeds to S1008. Otherwise (S1006), the terminal apparatus 1 proceeds to S1008.

Processing in S1008 to S1013 in FIG. 10 is the same as the processing in S604 to S609 in FIG. 6.

Figure 11:
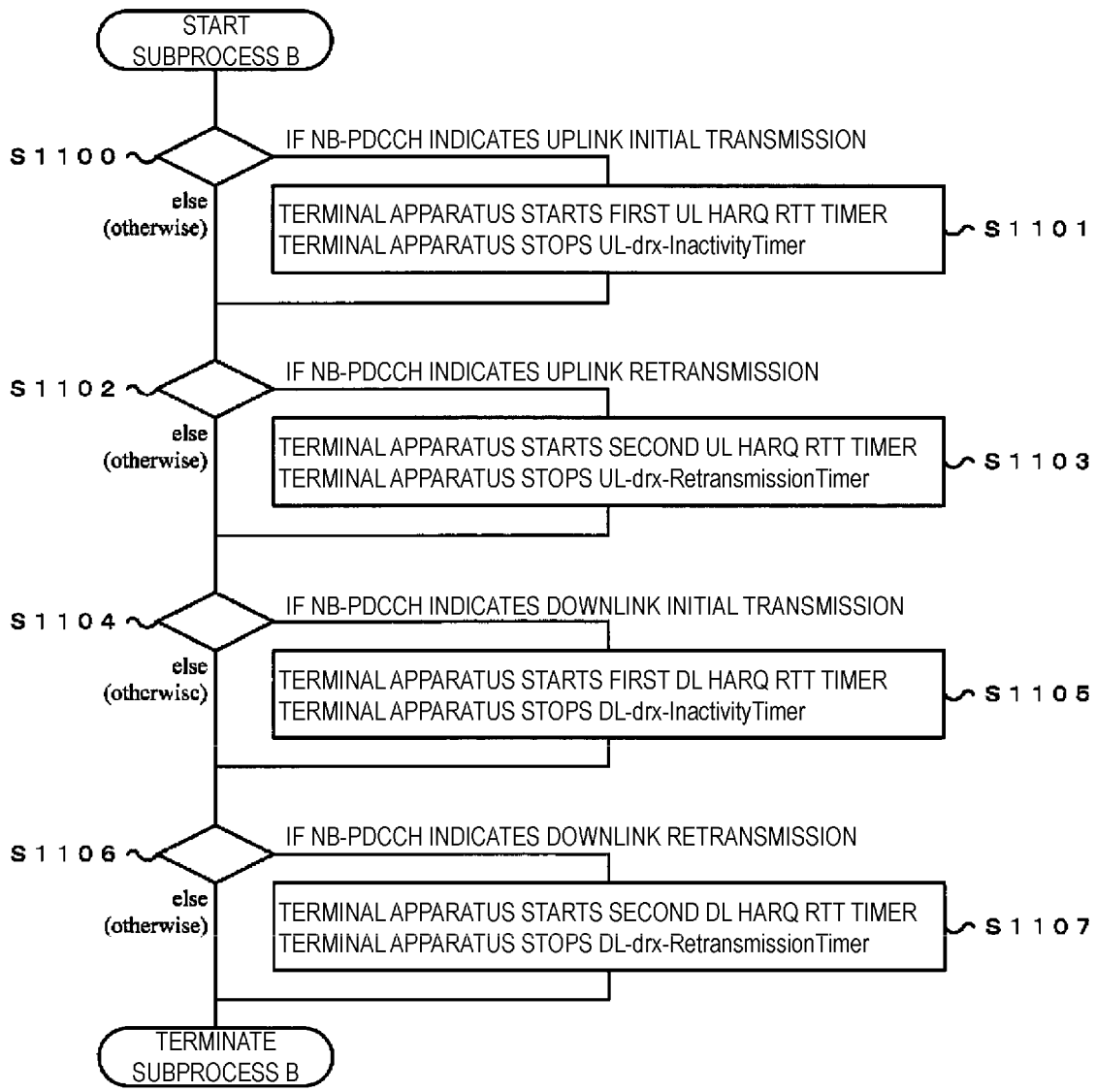
FIG. 11 is a flowchart illustrating an example or a subprocess B in the second example of the DRX operation according to the present embodiment.

In S1014, the terminal apparatus 1 performs a subprocess B and terminates the DRX operation on the current subframe. FIG. 11 is a flowchart illustrating an example of the subprocess B in the second example of the DRX operation according to the present embodiment.

If the downlink control information received on the NB-PDCCH indicates an uplink initial transmission (S1100), the terminal apparatus 1 starts the first UL HARQ RTT timer for the corresponding uplink HARQ process, stops the UL-drx-InactivityTimer for the corresponding uplink HARQ process (S1101), and then proceeds to S1102. Otherwise (S1100), the terminal apparatus 1 proceeds to S1102. The uplink initial transmission in S1100 may be an initial transmission of the NB-PUSCH including the uplink data.

If the downlink control information received on the NB-PDCCH indicates an uplink retransmission (S1102), the terminal apparatus 1 starts the second UL HARQ RTT timer for the corresponding uplink HARQ process, stops the UL-drx-RetransmissionTimer for the corresponding uplink HARQ process (S1103), and then proceeds to S1104. Otherwise (S1102), the terminal apparatus 1 proceeds to S1104. The uplink retransmission in S1102 may be a retransmission of the NB-PUSCH including the uplink data.

If the downlink control information received on the NB-PDCCH indicates a downlink transmission (S1104), the terminal apparatus 1 starts the first DL HARQ timer for the corresponding downlink HARQ process, stops the DL-drx-InactivityTimer for the corresponding downlink HARQ process (S1105), and then proceeds to S1106. Otherwise (S702), the terminal apparatus 1 proceeds to S1106. The downlink initial transmission in S1104 may be an initial transmission of the NB-PDSCH including the downlink data.

If the downlink control information received on the NB-PDCCH indicates a downlink retransmission (S1106), the terminal apparatus 1 starts the second DL HARQ RTT timer for the corresponding downlink HARQ process, stops the DL-drx-RetransmissionTimer for the corresponding downlink HARQ process (S1107), and then terminates the processing of the subprocess B. Otherwise (S1106), the terminal apparatus 1 terminates the processing of the subprocess B. The downlink retransmission in S1106 may be a retransmission of the NB-PDSCH including the downlink data.

The second UL HARQ RTT timer may be processed in the same manner as that for the first UL HARQ RTT timer illustrated in FIG. 8. The second DL HARQ RTT timer may be processed in the same manner as that for the first DL HARQ RTT timer illustrated in FIG. 9.

The above-described first example may be applied to the uplink, and the above-described second example may be applied to the downlink. The above-described second example may be applied to the uplink, and the above-described first example may be applied to the downlink.

Structures of the apparatuses according to the present embodiment will be described below.

Figure 12:
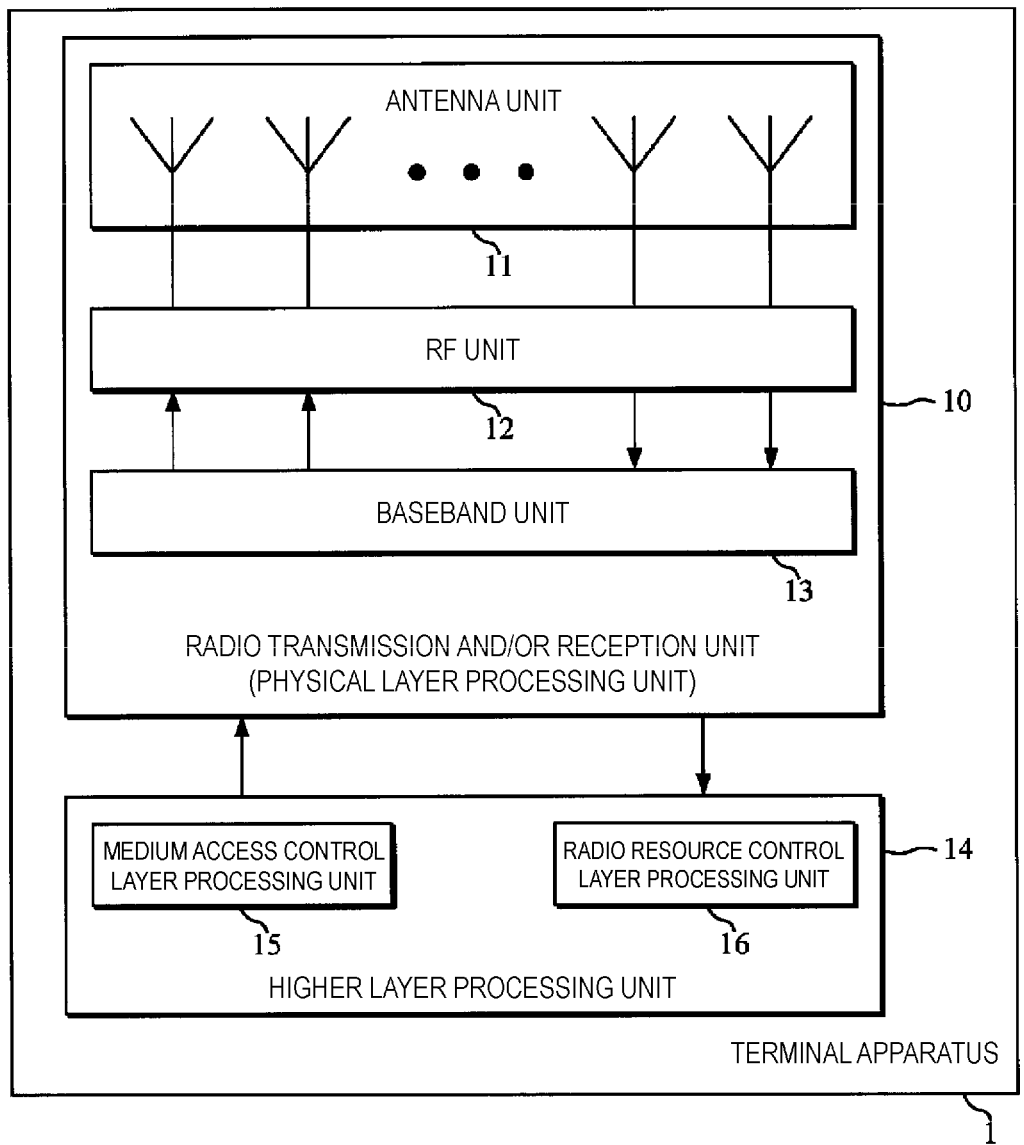
FIG. 12 is a schematic block diagram illustrating a configuration of a terminal apparatus 1 according to the present embodiment.

FIG. 12 is a schematic block diagram illustrating a configuration of the terminal apparatus 1 according to the present embodiment. As illustrated in FIG. 12, the terminal apparatus 1 is configured to include a radio transmission and/or reception unit 10 and a higher layer processing unit 14. The radio transmission and/or reception unit 10 is configured to include an antenna unit 11, a Radio Frequency (RP) unit 12, and a baseband unit 13. The higher layer processing unit 14 is configured to include a medium access control layer processing unit 15 and a radio resource control layer processing unit 16. The radio transmission and/or reception unit 10 is also referred to as a transmission unit, a reception unit or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, a Packet Data Convergence Protocol (PDCP) layer, a Radio Link Control (RLC) layer, and a Radio Resource Control (RRC) layer.

The medium access control layer processing, unit 15 included in the higher layer processing unit 14 performs processing of the medium access control layer. The medium access control layer processing unit 15 controls transmission of a scheduling request based on various configuration information/parameters managed by the radio resource control layer processing unit 16.

The radio resource control layer processing unit 16 included in the higher layer processing unit 14 performs processing of the radio resource control layer. The radio resource control layer processing unit 16 manages the various configuration information/parameters for the terminal apparatus 1 itself. The radio resource control layer processing unit 16 sets the various configuration information/parameters in accordance with a higher layer signaling received from the base station apparatus 3. Specifically, the radio resource control layer processing unit 16 sets the various configuration information/parameters in accordance with the information indicating the various configuration information/parameters received from the base station apparatus 3.

The radio transmission and/or reception unit 10 performs processing of the physical layer, such as modulation, demodulation, coding, and decoding. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 modulates and codes data to generate a transmit signal, and transmits the transmit signal to the base station apparatus 3.

The RF unit 12 converts (down-converts) a signal received through the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) on the signal from which the CP has been removed, and extracts a signal in the frequency domain.

The baseband unit 13 performs Inverse Fast Fourier Transform (IFFT) on data, generates an SC-FDMA symbol, attaches a CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the final result via the antenna unit 11. Furthermore, the RF unit 12 amplifies power. Furthermore, the RF unit 12 may have a function of controlling transmit power. The RF unit 12 is also referred to as a "transmit power control unit".

Figure 13:
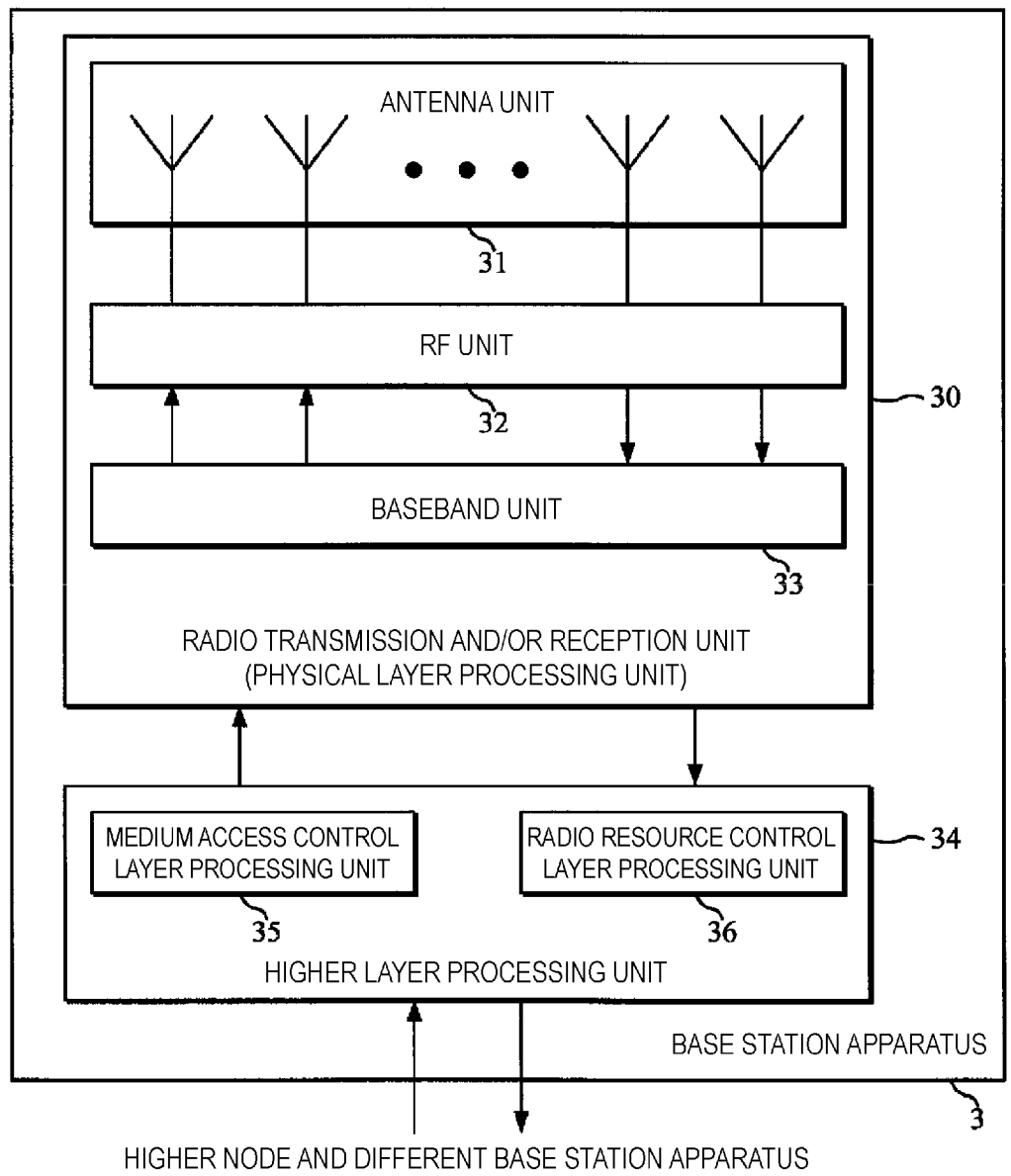
FIG. 13 is a schematic block diagram illustrating a configuration of a base station apparatus 3 according to the present embodiment.

FIG. 13 is a schematic block diagram illustrating a configuration of the base station apparatus 3 according to the present embodiment. As illustrated in FIG. 13, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmission unit, a reception unit or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the medium access control layer. The medium access control layer processing unit 35 performs processing associated with a scheduling request based on various configuration information/parameters managed by the radio resource control layer processing unit 36.

The radio resource control layer processing unit 36 included in the higher layer processing unit 34 performs processing of the radio resource control layer. The radio resource control layer processing unit 36 generates, or acquires from a higher node, downlink data (transport block) arranged on a physical downlink shared channel, system information, an RRC message, a MAC Control Element (CE), and the like, and outputs the generated or acquired data to the radio transmission and/or reception unit 30. Furthermore, the radio resource control layer processing unit 36 manages various configuration information/parameters for each of the terminal apparatus 1. The radio resource control layer processing unit 36 may set various configuration information/parameters for each of the terminal apparatus 1 via the higher layer signaling. In other words, the radio resource control layer processing unit 36 transmits/broadcasts information indicating various configuration information/parameters.

The functionality of the radio transmission and/or reception unit 30 is similar to that of the radio transmission and/or reception unit 10, and hence description thereof is omitted.

Each of the units included in the terminal apparatus 1 and denoted by reference numerals 10 to 16 may be configured as a circuit. Each of the units included in the base station apparatus 3 and denoted by reference numerals 30 to 36 may be configured as a circuit.

Aspects of the terminal apparatus 1 according to the present embodiment will be described below.

(1) In a first aspect of the present embodiment, the terminal apparatus 1 includes a Medium Access Control (MAC) layer processing unit configured to monitor the control channel (NB-PDCCH) during an active time in a case that a discontinuous reception (DRX) is configured, the active time includes at least a period when a first timer (DL-drx-InactivityTimer) is running and a period when a second timer (UL-drx-InactivityTimer) is running, the first timer is stopped based on reception of the control channel indicating a downlink transmission, and the second timer is stopped based on reception of the control channel indicating an uplink transmission.

(2) In the first aspect of the present embodiment, the first timer is started based on the downlink transmission.

(3) In the first aspect of the present embodiment, the first timer is started based on a transmission of a Hybrid Automatic Repeat request (HARQ-ACK) corresponding to the downlink transmission.

(4) In the first aspect of the present embodiment, whether the first timer is started based on the downlink transmission or on the transmission of the Hybrid Automatic Repeat reQuest (HARQ-ACK) corresponding to the downlink transmission is determined based on information received from the base station apparatus.

(5) In the first aspect of the present embodiment, the first timer is started based on expiration of a third timer (first DL HARQ RTT timer), and the third timer is started based on reception of the control channel indicating the downlink transmission.

(6) In the first aspect of the present embodiment, the downlink transmission is a transmission of a channel (NB-PDSCH) including downlink data.

(7) In the first aspect of the present embodiment, the downlink transmission includes a downlink initial transmission and a downlink retransmission.

(8) In the first aspect of the present embodiment, the second timer is started based on the uplink transmission.

(9) In the first aspect of the present embodiment, the second timer is started based on expiration of a fourth timer (first UL HARQ RTT timer), and the third timer is started based on reception of the control channel indicating the uplink transmission.

(10) In the first aspect of the present embodiment, the uplink transmission is a transmission of a channel (NB-PUSCH) including uplink data.

(11) In the first aspect of the present embodiment, the uplink transmission includes an uplink initial transmission and an uplink retransmission.

With this configuration, the terminal apparatus and the base station apparatus are capable of efficiently communicating with each other.

The base station apparatus 3 according to the present invention can be realized as an aggregation (an apparatus group) constituted of multiple apparatuses. Apparatuses constituting such an apparatus group may be each equipped with some or all portions of the functionalities or functional blocks of the base station apparatus 3 according to the above-described embodiment. The apparatus group may include at least general functionalities or general functional blocks of the base station apparatus 3. Furthermore, the terminal apparatus 1 according to the above-described embodiments can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functionalities of a node higher than an eNodeB.

A program running on each of the apparatuses according to the present invention may serve as a program that causes a computer to operate by controlling a Central Processing Unit (CPU) and the like in such a manner as to enable the functionalities according to the above-described embodiment of the present invention. A program or information handled by the program is temporarily loaded into a volatile memory such as a Random Access Memory (RAM) or stored in a nonvolatile memory such as a flash memory or a Hard Disk Drive (HDD) while being processed. The CPU reads the program or information as needed, and performs modification or writing.

Note that each of the apparatuses according to the above-described embodiments may be partially realized by a computer. In such a case, a program for enabling such control functionalities may be recorded on a computer-readable recording medium to cause a computer system to read the program recorded on the recording medium for execution. Note that it is assumed that the "computer system" here refers to a computer system built into each of the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. Furthermore, the above-described program may be configured to enable some of the functions described above, and additionally may be configured to enable the functions described above, in combination with a program already recorded in the computer system.

Furthermore, the functional blocks or features of the apparatuses used in the above-described embodiments may be implemented or performed by an electric circuit, i.e., typically an integrated circuit or multiple integrated circuits. The electric circuit designed to perform the functions described herein may include a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. Although the general-purpose processor may be a microprocessor, the processor may be a processor of known type, a controller, a micro-controller, or a state machine instead. The general-purpose processor or the above-mentioned circuits may include digital circuits or analogy circuits. Furthermore, in a case that, with advances in semiconductor technology, a circuit integration technology with which the current integrated circuit is replaced appears, it is also possible to use an integrated circuit based on the technology.

Note that the present invention is not limited to the above-described embodiments. In the above-described embodiments, examples of the apparatuses have been described, but the present invention is not limited to these examples, and is applicable to a terminal apparatus or a communication apparatus for a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

REFERENCE SIGNS LIST (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus comprising:
reception circuitry configured to monitor Narrow Band Physical Downlink Control Channel (NB-PDCCH); and
medium access control layer processing circuitry configured to perform a DRX functionality that controls monitoring of the NB-PDCCH, wherein
the medium access control layer processing circuitry
starts a downlink HARQ RTT timer in a case that the NB-PDCCH indicates a downlink transmission,
starts an uplink HARQ RTT timer in a case that the NB-PDCCH indicates an uplink transmission,
starts a drx-InactivityTimer in a case that the downlink HARQ RTT timer expires,
starts the drx-InactivityTimer in a case that the uplink HARQ RTT timer expires,
stops the drx-InactivityTimer in a case that the NB-PDCCH indicates the downlink transmission, and
stops the drx-InactivityTimer in a case that the NB-PDCCH indicates the uplink transmission.

2. The terminal apparatus according to claim 1, wherein the medium access control layer processing circuitry starts a DL-drx-RetransmissionTimer in a case that the downlink HARQ RTT timer expires,
starts an UL-drx-RetransmissionTimer in a case that the uplink HARQ RTT timer expires,
stops the DL-drx-RetransmissionTimer in a case that the NB-PDCCH indicates the downlink transmission, and
stops the UL-drx-RetransmissionTimer in a case that the NB-PDCCH indicates the uplink transmission.

3. The terminal apparatus according to claim 2, wherein the reception circuitry receives first information indicating a value of the drx-InactivityTimer, second information indicating a value of the UL-drx-RetransmissionTimer, and third information indicating a value of the DL-drx-RetransmissionTimer.

4. The terminal apparatus according to claim 1, wherein the media access control layer processing circuitry
starts a drx-RetransmissionTimer in a case that the uplink HARQ RTT timer expires,
stops the drx-RetransmissionTimer in a case that the NB-PDCCH indicates the uplink transmission, and
stops the drx-RetransmissionTimer in a case that the NB-PDCCH indicates the downlink transmission.

5. A communication method used by a terminal apparatus, the communication method comprising:
monitoring a Narrow band physical downlink control channel (NB-PDCCH);
performing a DRX functionality that controls monitoring of the NB-PDCCH;
starting a downlink HARQ RTT timer in a case that the NB-PDCCH indicates a downlink transmission;
starting an uplink HARQ RTT timer in a case that the NB-PDCCH indicates an uplink transmission;
starting a drx-InactivityTimer in a case that the downlink HARQ RTT timer expires;
starting the drx-InactivityTimer in a case that the uplink HARQ RTT timer expires; and
stopping the drx-InactivityTimer in a case that the NB-PDCCH indicates the downlink transmission, and
stopping the drx-InactivityTimer in a case that the NB-PDCCH indicates the uplink transmission.

6. An integrated circuit that is built into a terminal apparatus, the integrated circuit comprising:
reception circuitry configured to monitor a Narrow band physical downlink control channel (NB-PDCCH); and
medium access control layer processing circuitry configured to perform a DRX functionality that controls monitoring of the NB-PDCCH, wherein
the medium access control layer processing circuitry
starts a downlink HARQ RTT timer in a case that the NB-PDCCH indicates a downlink transmission,
starts an uplink HARQ RTT timer in a case that the NB-PDCCH indicates an uplink transmission,
starts a drx-InactivityTimer in a case that the downlink HARQ RTT timer expires,
starts the drx-InactivityTimer in a case that the uplink HARQ RTT timer expires,
stops the drx-InactivityTimer in a case that the NB-PDCCH indicates the downlink transmission, and
stops the drx-InactivityTimer in a case that the NB-PDCCH indicates the uplink transmission.

* * * * *